United States Patent Office 3,132,530
Patented May 12, 1964

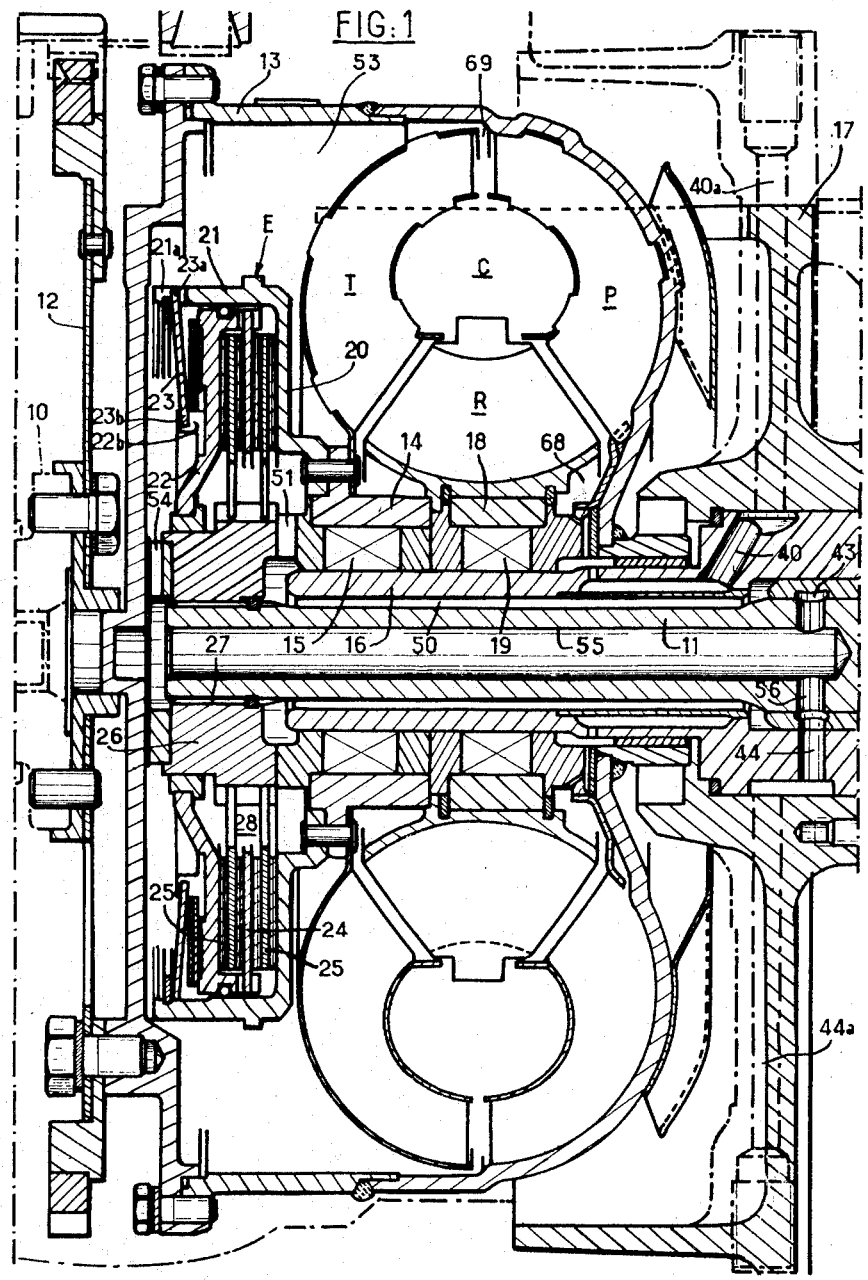

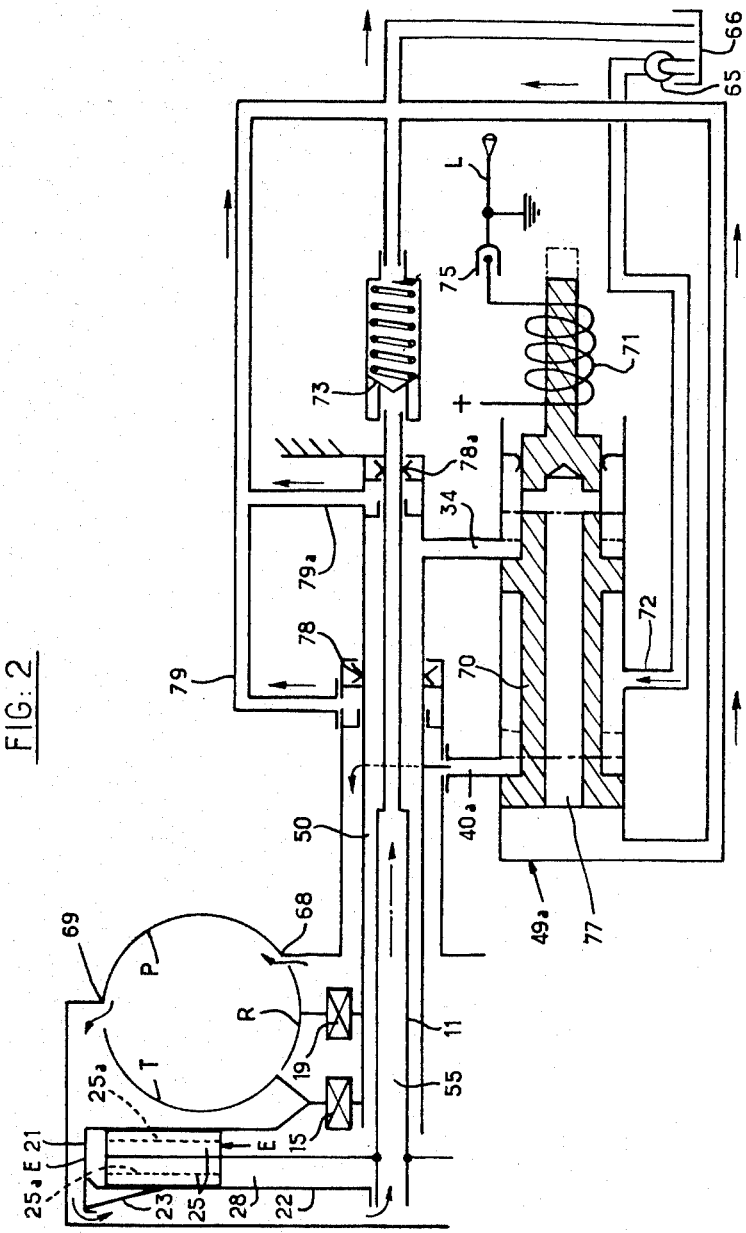

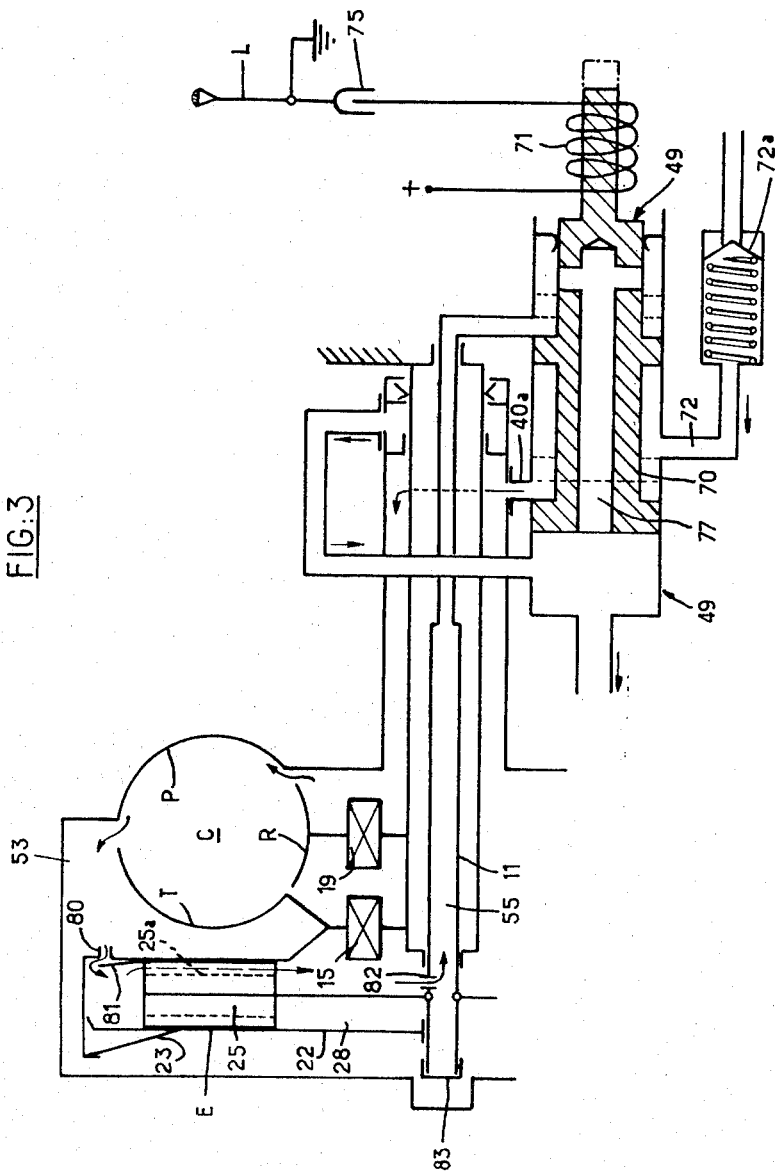

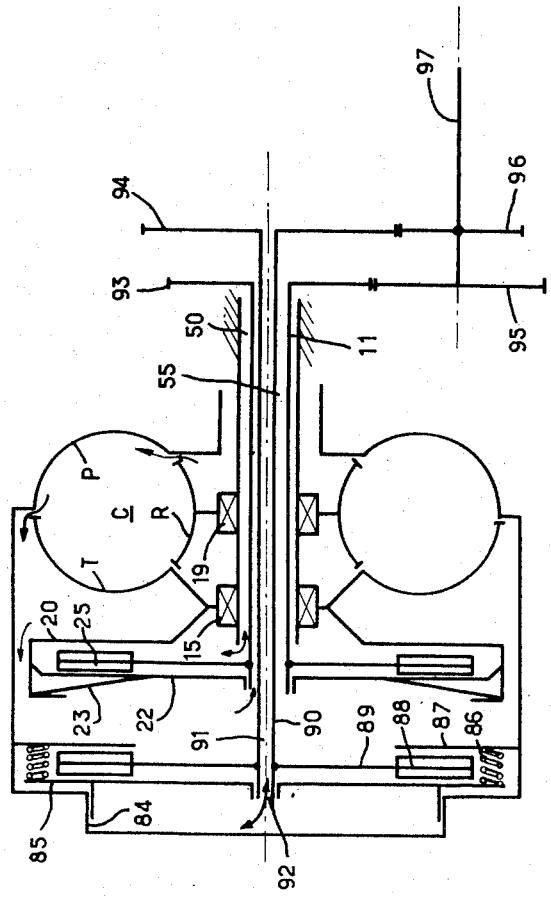

3,132,530
TRANSMISSIONS INCORPORATING A HYDRAULIC DEVICE WITH DISENGAGEABLE OUTPUT SHAFT
Raymond Le Brise, Saint-Denis, Seine, France, assignor to Societe Anonyme Française du Ferodo, Paris, France, a corporation of France
Filed Feb. 23, 1961, Ser. No. 91,036
Claims priority, application France Feb. 25, 1960
5 Claims. (Cl. 74—330)

The present invention relates to a transmission system, especially for an automobile vehicle, comprising a hydraulic torque converter or a coupler and clutch means for engaging and disengaging a driven member of the said converter, the clutch means being particularly capable of being incorporated in the chamber of the converter itself, on the engine side; this assembly may be followed by a gear box with one or more gears, the construction of which may be conventional. The engagement and disengagement means comprises a chamber of variable volume rigidly connected for rotation with the driven member of the converter. It is the variations of the volume of this chamber which ensure the application or the release of a friction system coupled for rotation to the output member which drives the gear box.

The present invention has for its object improvements in transmissions of the type indicated above, which are especially characterized in that the application of the clutch means is determined not only by the resultant of the hydraulic forces acting in the interior and at the exterior of the variable volume chamber, but also by an elastic force acting in the direction of engagement. Thus, in the absence of hydraulic pressure, the members of the clutch remain coupled together so as to give a pre-determined torque; this in particular enables the engine to be started by setting the vehicle in motion.

In accordance with a further characteristic feature of the invention, the assembly of the driven member of the converter and of the clutch chamber is mounted through the intermediary of a one way brake on a fixed bearing surface of the device. This enables the vehicle to be immobilized when parked and prevents its backward movement on a slope.

The clutch means is preferably designed to have a small diameter and is provided with two or more discs. This arrangement confers the following advantages:

The inertia of the whole of the driven portion is thereby reduced. The drag torque becomes small in all circumstances, although multi-disc clutches present difficulties in providing that a simultaneous disengagement of the various friction discs may be effective. The different surfaces of the pressure plates preferably have conical parallel shapes, whereas the discs carrying the friction linings are flat but have a certain elasticity. The central plate is provided with adequate heat inertia. The reduction of the diameter of the clutch enables the influence of hydraulic pressure forces due to the centrifuging of the liquid on the two faces of the pressure plate to be reduced and gives greater importance to the static pressure which can more easily be controlled.

Certain forms of embodiment of the invention are described below by way of example, reference being made to the accompanying drawings, in which:

FIG. 1 is a view in longitudinal cross-section of a transmission device according to the invention;

FIG. 2 is a diagram of the hydraulic circuit of this device;

FIGS. 3 and 4 respectively relate to two alternative forms of embodiment.

Reference will first be made to FIGS. 1 and 2, in which there is shown at 10 the driving shaft and at 11 the driven shaft of the transmission device according to the invention. This device is particularly intended for mounting on automobile vehicles comprising a gear box arranged following the shaft 11 and actuated by a gear-changing lever L (see FIG. 2). The driving shaft 10 is coupled through a flexible diaphragm 12 to the bell 13 of the torque converter C, of which the pump P, the turbine T and the reactor R are shown. The pump P is rigidly fixed to the bell 13. The turbine T is fixed to a member 14 which is prevented from rotating in the reverse direction by a one-way brake 15 with a fixed sleeve 16. The latter is rigid with the fixed casing 17 of the device and surrounds the driven shaft 11. The reactor R is rigidly fixed to a further member 18 which is similarly prevented from rotating in the reverse direction by a one-way brake 19 also located on sleeve 16.

The member 14 is fixed to the supporting plate 20 of a clutch E of the device. This clutch is intended to couple or de-couple the turbine T with the driven shaft 11 at will, and preferably automatically depending on whether the gear-changing lever L of the vehicle is at rest or actuated by the user.

In a cylindrical peripheral portion 21 of the plate 20, forming a drum of small diameter is engaged a pressure plate or piston 22 which is urged towards the plate 20 by a spring formed as a Belleville washer 23. The clutch E further comprises an intermediate plate 24 slidably engaged with the plate 22, while two friction discs 25 are intercalated with the plates 20, 24 and 22. The discs 25 are coupled with a hub 26 mounted on splines 27 on the shaft 11. In addition to its function as a clutch spring, the washer 23 ensures the coupling for rotation of the plate 22 with the plate 20. To this end, the washer 23 is provided with tenons 23a engaged in mortices 21a of the drum 21, while tenons 23b of the washer 23 are engaged in mortices 22b of the plate 22.

The double-disc clutch E is operated in dependence on the oil pressures which are developed on the one hand in the chamber 28 formed between the plates 20 and 22 and on the other hand outside the plate 22.

The chamber 28 communicates with a system of conduits constituted by radial grooves 51 in the hub or ring 26 and a conduit 50 formed by the annular space comprised between the sleeve 16 and the shaft 11. The supply of the working circuit of the torque converter is effected across the free space 68 existing between the outlet of the reactor R and the inlet of the pump P by a system of conduits comprising an oblique conduit 40 which is pierced through the body of the sleeve 16, and which communicates with a conduit 40a bored in the thickness of the wall of the fixed casing 17.

The oil which has passed into the torque converter C passes out, in part, continuously from the working circuit through the free space 69 formed between the outlet of the pump P and the intake of the turbine T; it then passes at 53 round the periphery of the drum 21 and thence into radial grooves 54 in the ring 26, after which it circulates to the centre of the shaft 11 through a conduit 55 bored over a part of its length, and which is extended through the wall of the shaft 11 into two radial conduits 56 delivering into an annular collector 43 which is coupled by a conduit 44 to a conduit 44a bored in the thickness of the wall of the casing 17.

The oil under pressure required for the operation of the torque converter C and the clutch E is derived (FIG. 2) from the lubrication circuit of the engine, comprising a pump 65 drawing from a casing 66. The oil is directed as required towards the various conduit systems which have been indicated above, and which supply the working circuits through a distribution valve 49a (FIG. 2) provided with a slide 70, the system of connections of this valve with the converter being shown diagrammatically in FIG. 2.

The sliding member 70 of the valve 49a is maintained elastically in the position shown in FIG. 2 as long as the operating electro-magnet 71 is not excited. The torque converter C is simultaneously located in its working position or so-called engaged position. The oil under pressure discharged from the pump 65 and drawn from the casing 66 reaches the valve through a conduit 72; it passes out through a conduit which is coupled to the conduit 40a, from which it reaches the converter C at 68, between the pump P and the reactor R. It passes out at 69 between the pump P and the turbine T, passes round the drum 21, thus increasing the application pressure of the clutch E, follows the conduit 55 of the hollow shaft 11, passes through a calibrated non-return valve 73, the setting of which is adjusted so as to maintain in the torque converter a pressure which permits cavitation to be avoided, and from the other side of this valve the oil returns to the casing 66.

When the driver wishes to change the gear ratio, he operates the gear lever L, by means of which he closes at the same time a switch 75 which excites the electro-magnet 71 and displaces the slide-valve 70 of the distributor 49.

In this second position of the slide-valve, the distributor which receives the oil under pressure through the conduit 72 directs it through the conduits 34 and 50 to the chamber 28, in which the pressure rises and pushes back the piston 22 to compress the Belleville washer 23. The friction discs 25 are thus freed.

If in this operation the driver engages a higher gear, the friction discs 25 then rotate at a lower speed than the members coupled to the converter, and since the friction linings 25 are provided with radial grooves 25a, they brake the mass of oil contained in the chamber 28. For this reason, the effects of centrifugal force which can act freely in the converter chamber become preponderant and are added to the thrust of the spring 23 on the piston 22 so as to reduce the period of engagement of the clutch. In this way, at the moment when the driver releases the lever L, the electro-magnet 71 is de-excited, the slide-valve 70 returns to its initial position in which, on the one hand the supply of the converter is ensured, and on the other hand the oil which was under pressure in the chamber 28 returns to the casing 66 through the conduit 50 and the central conduit 77 of the slide-valve 70, at a speed which increases with increasing force applied to the piston 22, and for this reason, the response time of the clutch is very short, this being effectively the objective desired in the case of transition from a lower gear ratio to a higher ratio.

The method of de-clutching remains the same when the driver changes-down, but in this case when the friction-discs 25 have been freed, they begin to rotate more rapidly and thereby increase the effects of centrifugal force which act in opposition to the spring 23 and prolong the duration of engagement, thus supplying automatically the gradual progression which is necessary at the moment of re-engagement when passing from a high gear ratio to a lower ratio, in spite of the fact that the slide-valve 70 having returned to the engaged position when the driver released the gear-lever L, the oil in the chamber 28 has begun to flow-back to the casing 66 over the path already indicated. The circumstances are therefore very favorable, the device giving a rapid action or a very gradual action according to requirements.

The bearings on or in which the concentric shaft rotates are provided with a piping system 79, 79a on the upstream side of their sealing joints 78 and 78a, the piping conveying the oil which escapes from the bearings back to the casing 66 in order to avoid putting the said joints under pressure and risk of damage to them.

It will be appreciated that by the continuous action of the washer 23 tending to engage the clutch E, it is possible to start up the engine by setting the vehicle in motion, while the one way brake 15 enables the vehicle to be immobilized for parking and prevents and backward movement on a slope.

In an alternative form of the invention shown in FIG. 3, a preferably calibrated orifice 80 enables the chamber 53 of the torque converter C to communicate with the chamber 28 of the clutch E, and it is provided with a non-return valve 81 which prevents the flow of oil in the opposite direction. The cross-section of the orifice 80 is calculated so as to maintain a pressure in the converter chamber which permits cavitation in said chamber to be avoided. The oil which has been used for the operation of the converter, and which comes from the valve distributor 49, passing through the conduits 40a, cannot therefore return to the engine casing except by passing through the radial grooves 25a of the linings 25. It then passes through a hole 82 in the conduit 55 of the shaft 11, the front orifice of which is closed by a plug 83 so as to isolate it from the converter chamber in which a higher pressure exists and from thence it passes to the central conduit 77 of the slide-valve 70 of the distributor 49.

When the driver changes gear, the movement of the lever L closes the contact 75 which energizes the electro-magnet 71 and brings the slide-valve 70 to its other position, in which the oil under pressure which arrives through the conduit 72 passes out through the conduit 55 and the hole 82, and reaches the chamber 28; it passes through the radial grooves 25a, closes the valve 81, the pressure then increases in the chamber 28, pushes back the piston 22 while compressing the spring 23, and thus ensures the disengagement of the friction discs 25. This operation is facilitated by the fact that in this position, the slide-valve 70 puts the casing 66 into communication with the conduit 40a, through which flows the oil contained in the working circuit of the converter, the result of this being to cause the pressure in the converter chamber to fall.

The intake conduit 72 for oil under pressure to the distributor 49 is provided with a non-return valve 72a to prevent the over-pressure which is created in the chamber 28 from causing any flow of oil in a direction opposite to the supply flow.

In a further alternative form of the invention shown in FIG. 4, there can be seen the same clutch device as in FIG. 2, effecting the continuous but disengageable coupling of the turbine T with the input shaft 11 of the gear-box, in the operation of which nothing has been changed. The casing of the torque converter is however extended towards the front to form a larger chamber while a hydraulic cylinder 84 is provided, in which slides a piston 85, constantly maintained and held back towards the bottom of the cylinder 84 by a set of clutch springs 86 which are supported on the one hand in the vicinity of its periphery and on the other hand on a ring 87 mounted inside and rigidly fixed to the casing, and which forms a reaction plate on which the piston 85 can apply the friction linings 88 of a friction disc 89 rigidly fixed to a shaft 90, the latter being hollow over its whole length so as to form a conduit 91, the front orifice 92 of which opens into the cylinder 84 by passing through the piston 85 in which it is centered.

The shaft 90 passes into the interior of the shaft 11, thus forming an annular space between the two shafts which constitutes the conduit 55.

The shafts 11 and 90 each carry at their other extremities a toothed pinion 93 and 94 respectively, in constant engagement with one of the pinions 95 and 96, the latter being both rigidly fixed on a shaft 97.

It can be seen that the friction linings 25 being normally applied by the spring 23 between the drum 20 and the piston 22, when the pump P drives the turbine T, the friction disc 89 rotates in the same direction as the discs 25, but at a speed which depends on the ratio of the combination of the two gear trains in constant engagement.

Similarly, if the conduit 50 is put into communication with the oil intake, and if the oil under pressure is sent through the conduit 91 into the cylinder 84, the piston 85 is pushed back so as to compress the springs 86, and the application of the friction linings 88 is thereby ensured.

The friction disc 89 then rotates, together with the shaft 90, at the speed of the shaft 10, while the friction discs 25 are disengaged and rotate in the same direction at a speed which is a function of the ratio of the trains in constant engagement. By suitable conjoint operation of the control of the two clutches, it is possible to introduce a certain degree of overlap in their operation, which permits the break in the transmission effort during gear changing to be avoided. With this device, the drive of the vehicle can be effected just as well from the shaft 97 as from the shaft 90.

It will be noted that the device of FIG. 4 with two clutches and two trains of gears in constant engagement enables the engine brake to be used on both the shafts 11 and 90.

It will also be observed that it is possible to interpose a free wheel in one of the two trains of gears in constant engagement, for example between the pinion 95 and its shaft 97, but in this case only the shaft 70 is available for the engine brake and it becomes useless to disengage the second friction disc.

Finally, it should be noted that the shafts 11 and 90 can be utilized, instead of operating the two parallel trains of gears, to drive the two input shafts of an epicycloidal train which would rotate as a unit in direct gear, when the two clutches were engaged.

What I claim is:

1. A transmission device especially for an automobile vehicle, comprising a frame, a hydraulic coupling having at least one pump and one turbine, a driving member for driving said pump, a driven member coupled to said turbine by clutch means, said clutch means comprising a chamber of variable volume rigidly connected for rotation with said turbine and containing a friction system including at least one member connected for rotation with said driven member and having an elastic device for urging said friction system into an engaged position, a source of fluid pressure, selective control means having associated guideways for applying said fluid pressure externally and internally of said chamber wherein one of said guideways is associated with said hydraulic coupling whereby fluid passing therethrough is caused to flow externally of said chamber to thereby cause an increase of application pressure of said clutch means and wherein another one of said guideways is associated with an inner portion of said chamber for introducing fluid thereto for increasing the pressure therein to thereby decrease the application of said clutch means.

2. A transmission device as claimed in claim 1, in which said variable volume chamber comprises two portions axially movable one with respect to the other and consisting respectively of a drum and a piston, and in which said elastic device comprises a Belleville washer acting between said two portions, said Belleville washer being shaped so as to connect said drum for rotation with said piston.

3. A transmission device as claimed in claim 1 in which said friction system comprises at least two friction discs.

4. A transmission device as claimed in claim 1, and further including a clutch acting between the driving member and a second driven shaft, fluid means controlling said further clutch, and a train of gears coupling the two driven shafts for continuous engagement.

5. A transmission device especially for an automobile vehicle, comprising a frame, a hydraulic coupling having at least one pump and one turbine, a driving member for driving said pump, a driven member coupled to said turbine by means comprising a chamber of variable volume rigidly connected for rotation with said turbine and containing a friction system including at least one member connected for rotation with said driven member and having spring means for urging said friction system into an engaged position, a source of fluid pressure, and selective control means having associated guideways for applying said fluid pressure externally and internally of said chamber wherein one of said guideways is associated with said hydraulic coupling whereby fluid passing therethrough is caused to flow externally of said chamber to thereby cause an increase of application pressure of said means coupling the driven member to said turbine and wherein another one of said guideways is associated with an inner portion of said chamber for introducing fluid thereto for increasing the pressure for therein to thereby decrease the application of said means coupling the driven member to said turbine.

References Cited in the file of this patent
UNITED STATES PATENTS

| | | |
|---|---|---|
| 2,178,017 | Fedden et al. | Oct. 31, 1939 |
| 2,866,361 | Gatiss | Dec. 30, 1958 |
| 2,917,950 | Duffield | Dec. 22, 1959 |